United States Patent
Borst et al.

(10) Patent No.: US 8,608,464 B2
(45) Date of Patent: Dec. 17, 2013

(54) CHECK VALVE

(75) Inventors: Peter Borst, Unlingen-Uigendorf (DE); Philip Schreier, Reutlingen (DE)

(73) Assignee: Rolf Prettl, Tuebingen (DE)

( * ) Notice: Subject to any disclaimer, the term of this patent is extended or adjusted under 35 U.S.C. 154(b) by 0 days.

(21) Appl. No.: 13/275,834

(22) Filed: Oct. 18, 2011

(65) Prior Publication Data

US 2012/0121449 A1    May 17, 2012

Related U.S. Application Data

(63) Continuation of application No. PCT/EP2010/002365, filed on Apr. 17, 2010.

(30) Foreign Application Priority Data

Apr. 28, 2009  (DE) .......................... 10 2009 018 930

(51) Int. Cl.
    *F04B 53/00* (2006.01)
(52) U.S. Cl.
    USPC ............................. 417/559; 137/852; 137/856
(58) Field of Classification Search
    USPC ........... 417/559; 137/856, 512.15, 512.4, 852
    See application file for complete search history.

(56) References Cited

U.S. PATENT DOCUMENTS

| | | | |
|---|---|---|---|
| 1,408,724 A | | 3/1922 | Decrow |
| 3,208,472 A | * | 9/1965 | Scaramucci ............... 137/454.2 |
| 3,312,237 A | * | 4/1967 | Mon et al. ................. 137/512.15 |
| 3,473,561 A | | 10/1969 | Svenson et al. |
| 3,990,439 A | * | 11/1976 | Klinger ..................... 128/207.12 |
| 5,245,956 A | * | 9/1993 | Martin ......................... 123/73 V |
| 5,375,621 A | | 12/1994 | Gaehwiler |
| 5,518,026 A | * | 5/1996 | Benjey ..................... 137/512.15 |
| 6,050,294 A | | 4/2000 | Makowan |
| 6,098,656 A | * | 8/2000 | Farina ........................ 137/512.1 |
| 6,253,788 B1 | * | 7/2001 | Palvolgyi ................... 137/512.1 |
| 6,648,012 B2 | * | 11/2003 | Linthorst ....................... 137/522 |

(Continued)

FOREIGN PATENT DOCUMENTS

| | | |
|---|---|---|
| DE | 4214783 | 9/1993 |
| DE | 20 2005 019518 | 4/2007 |
| EP | 0560221 | 9/1993 |

OTHER PUBLICATIONS

English translation of International Preliminary Report on Patentability issued Nov. 15, 2011 for PCT/EP2010/002365.

(Continued)

*Primary Examiner* — Devon Kramer
*Assistant Examiner* — Christopher Maxey
(74) *Attorney, Agent, or Firm* — Casimir Jones SC

(57) ABSTRACT

Check valve with a valve housing, on which is formed a valve seat. The valve seat is designed as an oblique face with respect to a flow direction. A shut-off element has at least one sheet-like shut-off tab which is composed of an elastically deformable material and which, in a shut-off position, bears against the valve seat and, in an opening position, is lifted off from the valve seat, in order to allow the passage of fluid. An abutment element is arranged on that side of the shut-off tab which faces away from the valve seat. The shut-off tab can abut against the abutment element in order to limit the amount by which the shut-off tab is lifted off from the valve seat.

7 Claims, 4 Drawing Sheets

(56) References Cited

U.S. PATENT DOCUMENTS

| | | | |
|---|---|---|---|
| 8,201,576 B2* | 6/2012 | Klein | 137/512.15 |
| 2002/0020370 A1* | 2/2002 | Araki | 123/73 PP |
| 2005/0063846 A1* | 3/2005 | Maeda | 417/471 |
| 2007/0056648 A1* | 3/2007 | Benjey | 137/855 |
| 2007/0157970 A1* | 7/2007 | Horng et al. | 137/512.15 |
| 2007/0267069 A1* | 11/2007 | Sarno et al. | 137/527 |
| 2010/0329911 A1* | 12/2010 | Borst et al. | 417/559 |

OTHER PUBLICATIONS

International Search Report dated Jun. 17, 2010 from International Patent Application No. PCT/EP2010/002365.

* cited by examiner

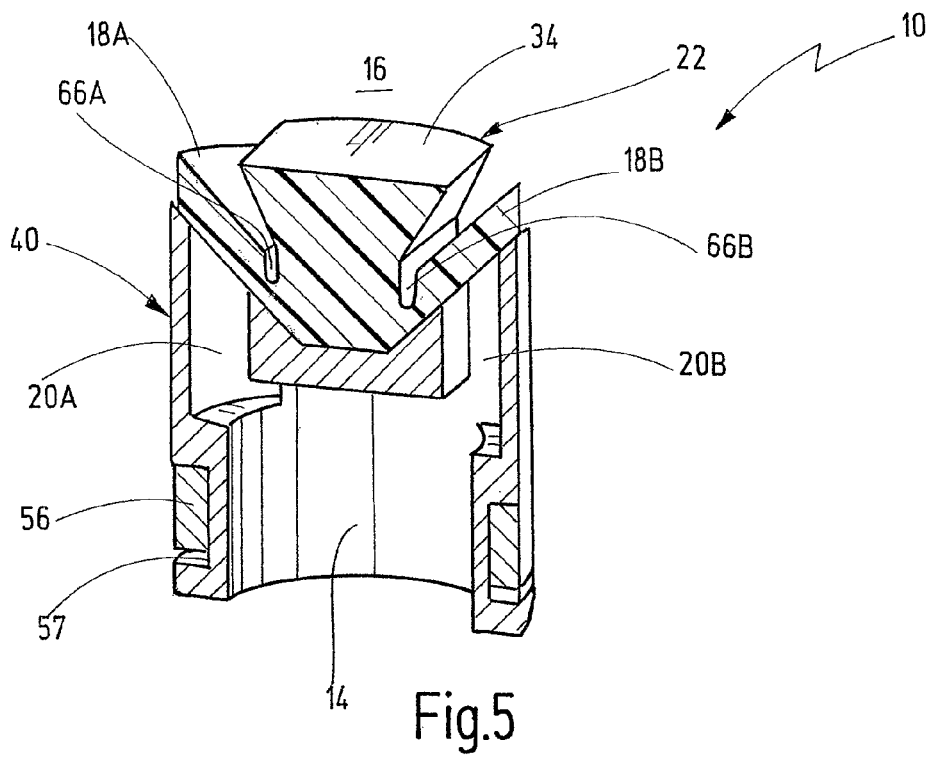
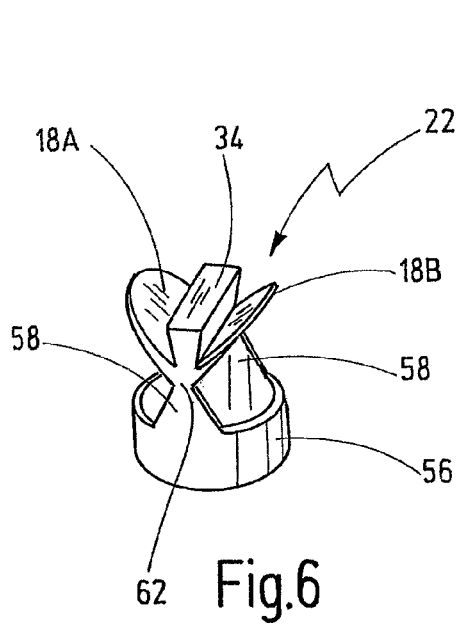
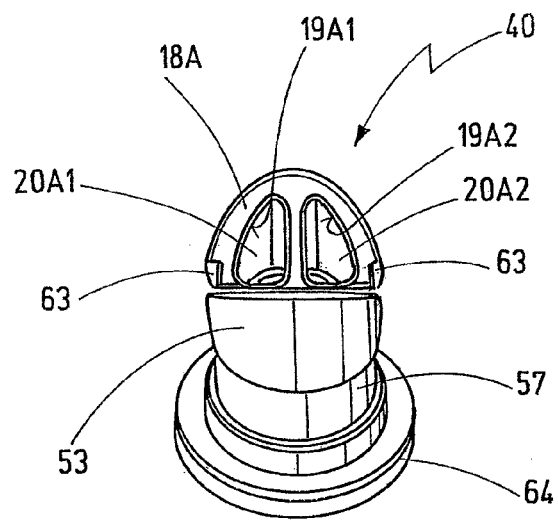

CHECK VALVE

CROSS REFERENCE TO RELATED APPLICATIONS

This is a continuation application of PCT/EP 201002365, filed Apr. 17, 2010 and claiming priority of German patent application DE 10 2009 018 930, filed Apr. 28, 2009.

BACKGROUND OF THE INVENTION

The present invention relates to a check valve with a valve housing, on which is formed a valve seat which is designed as an oblique face with respect to a flow direction, and with a shut-off element having at least one sheet-like shut-off tab which is composed of an elastically deformable material and which, in a shut-off position, bears against the valve seat and, in an opening position, is lifted off from the valve seat, in order to allow the passage of fluid.

The present invention relates, furthermore, to a fluid pump with a pump housing and with a piston which is mounted displaceably therein and which forms with the pump housing a pressure space, a suction connection of the pump being connected to the pressure space via a first check valve, and the pressure space being connected to a pressure connection of the pump via a second check valve.

A check valve of this type is generally known. A check valve serves in general for determining the direction of flow of a fluid and is a directional valve which automatically shuts off the passage of the fluid in one of the two flow directions.

In particular, ball check valves, as they may be referred to, are known, in which the shut-off element is formed by a ball which is pressed into the valve seat by a spring.

In an alternative embodiment, the valve seat is arranged perpendicularly to the flow direction and is closed by a flap. The flap may in this case, in particular, be suspended on an upper region, so that it automatically assumes the shut-off position by virtue of its dead weight.

The problems in check valves of this type are, on the one hand, the large number of components. On the other hand, particularly in the case of the check valve with a flap, the fluid flow in the opening position is disturbed because the flap is initially oriented approximately perpendicularly to the flow direction. This results in relatively low efficiency. Furthermore, the attainable frequencies in the rapid change from the shut-off position to the opening position, and vice versa, are relatively low.

Piston pumps are pumps for the conveyance of fluids, in a first stroke the fluid to be conveyed being sucked in through an inlet valve by means of the piston. Then, in a second stroke, said fluid is expelled through the outlet valve. Such a pump may also be designated as a positive displacement pump.

On account of the high pressures achievable, the situation where fluid emerges between the piston and the pump housing cannot be ruled out. This may be undesirable in closed circuits. Furthermore, this may also be undesirable if the fluid tends to crystallize out or to form lumps when at a standstill. This applies, for example, when the fluid pump is used for the pumping of urea. Pumps of this kind are used in urea injection systems, such as are employed in systems for purifying the exhaust gas from vehicles operated by diesel engine (known as DNOX systems).

BRIEF SUMMARY OF THE INVENTION

Against the above background, the object of the invention is to specify an improved check valve and an improved piston pump.

The above object is achieved by a check valve with a valve housing, on which is formed a valve seat which is designed as an oblique face with respect to a flow direction, and with a shut-off element having at least one sheet-like shut-off tab which is composed of an elastically deformable material and which, in a shut-off position, bears against the valve seat and, in an opening position, is lifted off from the valve seat, in order to allow the passage of fluid, wherein an abutment element, against which the shut-off tab can abut, is arranged on that side of the shut-off tab which faces away from the valve seat, in order to limit the amount by which the shut-off tab is lifted off from the valve seat.

Furthermore, the above object is achieved by a fluid pump with a pump housing and with a piston which is mounted displaceably therein and which forms with the pump housing a pressure space, a suction connection of the pump being connected to the pressure space via a first check valve, and the pressure space being connected to a pressure connection of the pump via a second check valve, wherein the first and/or second check valve are/is designed as a check valve according to the invention.

The invention can also be formulated in a simplified way as a check valve with an oblique valve seat, against which bears a shut-off tab which is composed of elastically deformable material and the deflection of which is limited by an abutment element.

By the measure of designing the valve seat as an oblique face, the fluid can flow in a less impeded or fluidically more beneficial way in the opening position. During the transition from the shut-off position to the opening position, the fluid presses the sheet-like shut-off tab away from the valve seat and can flow along the shut-off tab thus deflected, without the fluid in this case being diverted sharply with respect to the flow direction, as occurs, for example, in the case of conventional flap check valves. Moreover, the check valve according to the invention manages with only a few components. The valve is preferably composed only of the valve housing and of the shut-off element.

In the region of the valve seat, a valve orifice is formed, which may contain a plurality of individual orifices which can be closed jointly by a shut-off tab.

What can be achieved by forming the shut-off tab from an elastically deformable material is that the shut-off tab is prestressed into the shut-off position by virtue of its intrinsic elasticity. The shut-off position can therefore also in general be assumed reliably.

Moreover, preferably, the angle of the shut-off tab with respect to the longitudinal axis in the not yet installed state is at least equal to and, in particular, larger than the corresponding angle of the valve seat. As a result, the shut-off tab can be prestressed reliably into the shut-off position by virtue of its intrinsic elasticity.

The function of the check valve according to the invention resembles the functioning of the fish gills which are likewise optimized fluidically on account of evolution. Even when the actuating frequencies of the check valve are comparatively high, there is no tendency to fluttering here.

Furthermore, the high dynamics achievable are achieved in that the amount by which the shut-off tab is lifted off or deflected from the valve seat is limited by the abutment element. In other words, the opening angle of the shut-off tab can be limited. The actuating frequency can thereby be increased, since the shut-off tab can assume the shut-off position again more quickly. Since a valve orifice is usually in any case markedly smaller than the area of the shut-off tab, this can also be achieved without any losses in the delivery rate.

The check valve according to the invention is suitable for comparatively high actuating frequencies, for example for actuating frequencies of up to 20 Hz or even up to 60 or 70 Hz or even higher.

Moreover, a longer service life can be obtained, since the elastically deformable shut-off tab is deflected to only a limited extent. Also, where appropriate, a lower power loss can be achieved thereby, since the closing of the check valve can take place more quickly and less fluid in this case flows back.

In the fluid pump according to the invention, higher dynamics or a higher pumping frequency of the piston can likewise be achieved.

The object is therefore achieved in full.

In the check valve according to the invention, it is especially advantageous if an abutment face of the abutment element is oriented obliquely in such a way that the shut-off tab is also oriented obliquely in the opening position.

In general, it is possible that the shut-off tab bears areally against the abutment face in the opening position. However, it is especially preferable if, in the opening position, the shut-off tab is at a different angle than the corresponding abutment face. Adhesion of the faces due to adhesive forces can thereby be avoided.

Ideally, in the opening position, the shut-off tab can bear areally against the abutment face. As a result, point compressive loads upon that side of the shut-off tab which faces the abutment element can be avoided.

According to a further preferred embodiment, the abutment element extends approximately as far as the shut-off tab in the flow direction.

What can be achieved thereby, on the one hand, is that an end of the shut-off tab which is distal in the flow direction also bears against the abutment element. The situation can thereby be avoided where the distal end bends with respect to the abutment element. Furthermore, the achievable dynamics can also thereby be increased even further.

In general, the abutment element may be part of the valve housing or be fastened as a separate component to the valve housing.

It is especially preferable, however, if the abutment element is formed in one piece with the shut-off element.

In this embodiment, the number of components or the complexity of the valve housing can be reduced.

It is especially preferable in this case if, in the region of transition between the abutment element and the shut-off tab, a recess is formed which serves for increasing the movability of the shut-off tab.

In this embodiment, the shut-off tab may possess a certain thickness which, even in the case of a large valve orifice in the valve seat, can ensure a stable position of the shut-off tab in the shut-off position. On the other hand, movability in the opening direction or closing direction can be increased by means of such a recess which is formed at the proximal end of the shut-off tab. Consequently, by the improvement thus achieved in bending flexibility in relation to the thickness of the shut-off tab in the sealing region, the dynamics of the check valve can be improved once again.

The feature whereby the shut-off tab, at its proximal end facing the fastening portion, has a recess increasing the bending flexibility is considered in the present case, in conjunction with the check valve initially mentioned, as a specific invention.

Overall, it is preferable, furthermore, if the shut-off element has two shut-off tabs which are oriented in a V-shaped manner in longitudinal section.

In this embodiment, as a rule, two valve seats, which correspondingly form a V-shape in longitudinal section, are also formed on the valve housing.

A high throughflow rate can thereby be achieved along with a relatively small construction space. The valve consequently contains two parallel check valves. The radial forces occurring can thereby also be compensated with respect to one another. This design is therefore also preferably suitable when the check valve is part of a system movable in the flow direction, for example is arranged on a piston of a fluid pump.

In this case, it is especially advantageous if the two shut-off tabs are connected to one another in one piece. The number of components can thereby be kept small.

In the embodiment with two shut-off tabs, it is preferable if the abutment element is arranged in the region between the shut-off tabs.

As a result, the abutment element can have both an abutment face for one shut-off and an abutment face for the second shut-off tab.

In this case, it is especially advantageous if the abutment element is designed to widen conically in the flow direction.

The abutment element can thus provide two oblique abutment faces for the two shut-off tabs.

According to a further preferred embodiment, the abutment element is arranged such that the shut-off tabs cannot touch each other.

It is thereby also possible to prevent the shut-off tabs from influencing one another.

According to a further preferred embodiment, the abutment element is in this case designed as a volume element which fills the space defined between the shut-off tabs in an amount of at least 50%, in particular in an amount of at least 80%.

In this embodiment, a dead space lying behind the shut-off tabs in the flow direction is reduced. A lower power loss and an improved conveying capacity are consequently obtained.

This applies particularly when the check valve is part of a system movable in the flow direction, for example is arranged on a piston of a fluid pump. Maximum displacement by means of the check valve in the closing position can thereby take place, since the unused space is filled by the volume element and consequently the dead volume in the pressure region is reduced.

Overall, it is advantageous, furthermore, if the shut-off element has a fastening portion, by means of which the shut-off element is fastened to the valve housing.

Fastening in this case can take place by means of screws, by adhesive bonding, by a geometric form fit or by other types of fastening.

It is especially preferable, however, if the valve housing has a fastening recess which is oriented transversely with respect to the flow direction, the fastening portion being inserted into the fastening recess in order to secure the shut-off element to the valve housing with a form fit in the flow direction.

The shut-off element can thereby be fastened to the valve housing without any further components or materials. It is conceivable in this case that the shut-off element has a bead which runs transversely with respect to the flow direction and which is inserted into a corresponding transversely running recess of the valve housing in order to achieve a connection made with an axial form fit.

It is especially advantageous, however, if the fastening portion has a ring portion which is inserted into an annular fastening recess of the valve housing.

It is in this case especially advantageous that the shut-off element can also be fixed to the valve housing in the radial direction without any further measures.

It is in this case advantageous, furthermore, if the ring portion is connected to the shut-off tab via at least one longitudinal web portion.

This makes it possible to form the shut-off element in one piece, the longitudinal web portion connecting the ring portion and the shut-off tab (or the two shut-off tabs) to one another.

It is advantageous, furthermore, if the longitudinal web portion is arranged in a longitudinally oriented recess of the valve housing.

As a result, the fastening portion of the shut-off element can be integrated, for example, into a cylindrical contour of the valve housing, without the fastening portion projecting outwardly in the radial direction with respect to the cylindrical contour. In particular, this design is therefore suitable for using the check valve on a movable element, such as a piston.

Furthermore, it is advantageous in this case if the two shut-off tabs are connected to each other (for example in a V-shape) on a transverse web, the ends of which are in each case connected to the ring portion via a longitudinal web portion.

This embodiment makes it possible to have an axially stable connection between the shut-off tabs and the ring portion.

Overall, it is preferable, furthermore, if the valve housing has a cylindrical portion which has at least one longitudinal duct connected to the valve orifice, the valve seat being formed on an end face of the cylindrical portion.

This embodiment makes it possible, on the one hand, to have a simple housing set-up. This is because the second pressure space can in this case be formed, for example, by the cylindrical portion and a second housing portion. The longitudinal duct preferably forms part of a first pressure space. It is in this case advantageous, furthermore, that the check valve can be integrated in a simple way into a cylindrical piston, specifically on the end face of the latter.

It will be appreciated that the features mentioned above and those yet to be explained below can be used not only in the combination specified, but also in other combinations or alone, without departing from the scope of the present invention.

BRIEF DESCRIPTION OF PREFERRED EMBODIMENTS

Exemplary embodiments of the invention are illustrated in the drawing and are explained in more detail in the following description. In the drawing:

FIG. 5 shows a longitudinal sectional view through the check valve of FIG. 4;

FIG. 6 shows a shut-off element of a check valve according to the invention, which can be used particularly in conjunction with the check valve of FIGS. 4 and 5; and FIG. 7 shows a modified embodiment of a valve housing of the check valve of FIGS. 4 and 5.

DETAILED DESCRIPTION OF PREFERRED EMBODIMENTS

Figure 1:
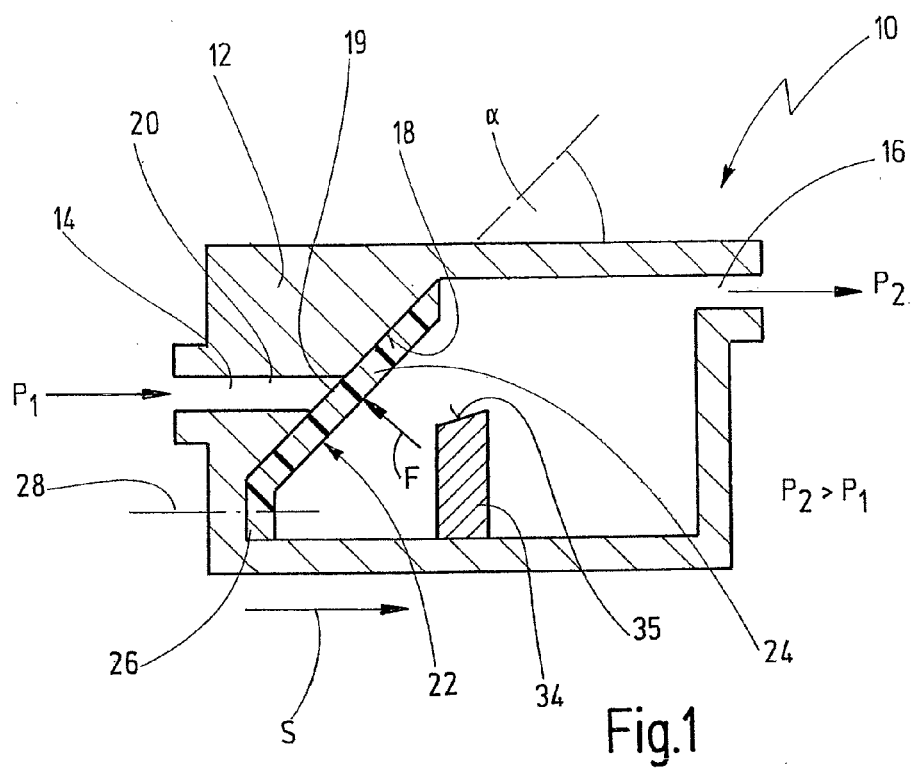
FIG. 1 shows a diagrammatic longitudinal sectional view through a first embodiment of a check valve according to the invention in a shut-off position.

In FIG. 1, a first embodiment of a check valve according to the invention is designated in general by 10. The check valve 10 has a valve housing 12. The valve housing separates a first pressure space 14, in which a fluid possesses a first fluid pressure $P_1$, from a second pressure space 16, in which the fluid possesses a second pressure $P_2$.

Inside the valve housing 12 is formed a valve space which is connected to the second pressure space 16.

The check valve sets up a flow direction S via which fluid can pass from the first pressure space 14 into the second pressure space 16. The flow direction S is parallel to a longitudinal extent of the check valve 10.

A side of the valve space which faces the first pressure space 14 is designed as a valve seat 18. The valve seat 18 is in this case designed as an oblique face which assumes an angle larger than 15° and smaller than 80°, in particular larger than 30° and smaller than 60°, in the present case 45°, with respect to the flow direction S.

On the valve seat 18, a valve orifice 19 is formed, which is connected to the first pressure space 14 via a longitudinal duct 20 in the valve housing 12. The valve orifice 19 may be an individual valve orifice or be composed of a plurality of separate individual orifices which are connected to the first pressure space 14.

The oblique face of the valve seat 18 may be designed as a planar face, as illustrated in FIG. 1. However, the oblique face may also be designed as a curved face which, for example, is shaped concavely or convexly in longitudinal section and/or in cross section.

Furthermore, a shut-off element 22 of the check valve 10 is arranged in the valve space. The shut-off element 22 is produced from an elastically deformable material, in particular a plastic, and has a shut-off tab 24. The shut-off tab 24 is adapted in terms of its shape to the valve seat 18, that is to say, in the present case, is designed as a planar tab (but may be a curved tab).

The shut-off element 22 has, furthermore, a fastening portion 26 formed in one piece with the shut-off tab 24. The fastening portion 26 is secured to the valve housing 12 in a rear region of the valve seat 18, as seen in the flow direction S. Fastening means 28 used for this purpose are illustrated diagrammatically in FIG. 1. The fastening means may be formed, for example, by one or more screws, rivets or the like. However, the fastening means 28 may also be formed by an adhesive bond. Alternatively, it is also possible for the fastening portion 26 to be formed in one piece with the valve housing 12 by the two-component method.

As stated, the shut-off element 22 is formed from an elastic material and is attached to the valve housing 12 via the fastening portion 26 such that a shut-off tab 24, in a relaxed position (that is to say, not deflected elastically), bears against the valve seat 18. Alternatively, it is also possible to design the shut-off element such that the shut-off tab 24 bears against the valve seat 18 with some prestress in the direction opposite to the flow direction S.

FIG. 1 shows the check valve 10 in a shut-off position in which the second pressure $P_2$ is higher than the first pressure $P_1$. The shut-off tab 24 is thereby pressed against the valve seat 18. The valve orifice 19 is consequently closed.

It will be appreciated that, when the pressures are considered as mentioned above, the intrinsic pressure applied, if appropriate, by the shut-off element 22 counter to the flow direction S may also be taken into account.

Figure 2:
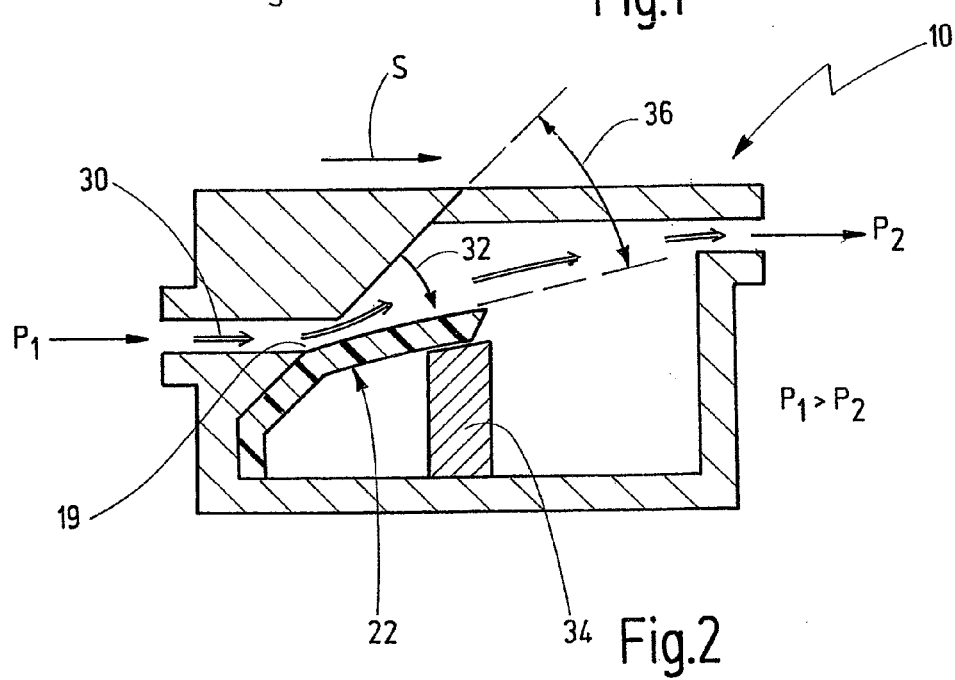
FIG. 2 shows the check valve of FIG. 1 in an opening position.

FIG. 2 shows the check valve 10 in an opening position. In this case, the first pressure $P_1$ is higher than the second pressure $P_2$ (once again, the possible prestressing force of the shut-off tab 24 may also be included). On account of the higher pressure $P_1$, a fluid located in the first pressure space 14 presses the shut-off tab 24 away from the valve seat 18 and deflects it, as shown diagrammatically at 32. As a result, as shown by double arrows, the fluid 30 can flow from the first fluid space 14 into the second fluid space 16. In this case, the fluid 30 does not impinge frontally, but obliquely, onto that side of the shut-off tab 24 which faces the first pressure space 14, so that said fluid can be conducted in a fluidically beneficial manner from the first fluid space 14 into the second fluid space 16. In particular, only a few eddies and other fluidically unfavorable phenomena arise. In other words, the flow impinges onto the shut-off tab 24 obliquely or laterally, in a similar way to the gills of a fish.

Overall, by means of the check valve, a high actuating frequency can be achieved, for example higher than 50 Hz, without fluttering of the shut-off element occurring. Furthermore, the shape of the shut-off tab 24 can be selected such that, in the event of a reversal of pressure, to initiate a suction stroke, pressing the shut-off tab back in the direction toward the valve seat 18 is assisted (for example, by the suitable shaping of a front end of the shut-off tab, as indicated diagrammatically in FIG. 2).

FIGS. 1 and 2 show, furthermore, that, in the valve space, an abutment element 34 is designed to limit the amount by which the shut-off tab 24 is lifted off or deflected 32 with respect to the valve seat 18, specifically to an angle 36. The angle 36 may lie in the range of a few degrees up to 45° and, in the embodiment illustrated, amounts to 30°. However, the angle of maximum deflection 32 is preferably smaller than 30°.

The abutment element has an abutment face 35 which is preferably oriented obliquely, specifically such that that side of the shut-off tab 24 which faces away from the valve seat 18 bears areally against said abutment face in the opening position.

The actuating frequency of the check valve can be increased even further by means of the abutment element 34. This is because the abutment element can prevent the situation where the shut-off element is deflected up to parallel to the flow direction or beyond this. The shut-off element can therefore also be moved back from the opening position into the shut-off position again more quickly.

Further alternative embodiments of check valves according to the invention are explained below. These correspond in terms of the general set-up and general functioning to the above-described check valve 10 of FIGS. 1 and 2. Only differences are explained below.

Figure 3:
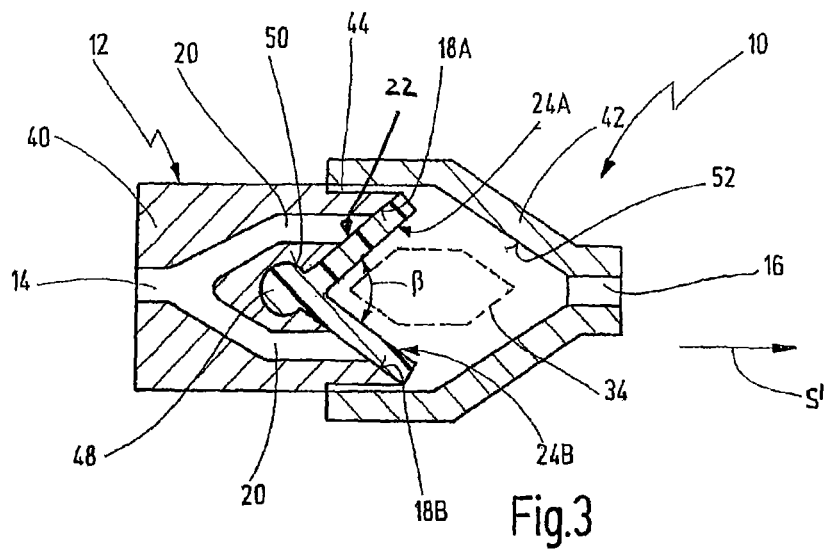
FIG. 3 shows a further embodiment of a check valve according to the invention in diagrammatic longitudinal section.

FIG. 3 shows an alternative embodiment of a check valve which has a valve housing 12 with a first subhousing 40 and with a second subhousing 42 which are connected to each other, for example, via thread engagement 44 or the like.

Furthermore, the check valve 10 of FIG. 3 has a shut-off element 22 containing two shut-off tabs 24A, 24B which are preferably connected to each other in one piece. The shut-off tabs 24A, 24B bear against corresponding valve seats 18A, 18B of the first subhousing 40 which are inclined in opposite directions with respect to the flow direction S. The valve seats 18A, 18B or the shut-off tabs 24A, 24B are therefore arranged in a V-shaped manner and form an angle 13 which is preferably larger than 40° and smaller than 150°.

Each of the valve seats 18A, 18B is assigned a specific longitudinal duct 20, the longitudinal ducts 20 being connected in each case to the first pressure space 14. FIG. 3 illustrates two longitudinal ducts 20, that is to say one longitudinal duct 20 per shut-off tab 24. However, a plurality of longitudinal ducts 20 (and corresponding valve orifices) may also be provided per shut-off tab 24.

Furthermore, the two shut-off tabs 24A, 24B are connected to each other in one piece, specifically via a transverse web 48. In the embodiment illustrated, the transverse web 48 is of bead-shaped design in longitudinal section and is pushed in the transverse direction (perpendicularly to the illustration plane) into a fastening recess 50 of the first subhousing 40. The shut-off element 22 can thereby be connected to the first subhousing 40 with a form fit in the flow direction S without any further fastening means.

In this embodiment, the valve space connected to the second pressure space 16 is formed between the first and the second subhousing 40, 42. The second valve housing 42 may in this case contain a conical face 52 which tapers in the flow direction toward the second pressure space 16. The flow of the fluid 30 in the opening position can thereby be optimized even further in fluidic terms.

Furthermore, FIG. 3 shows an abutment element 34 which is arranged between the two shut-off tabs 24A, 24B and which limits the amount of maximum deflection of the shut-off tabs 24A, 24B. Furthermore, the abutment element 34 is designed as volume element which extends into the valve space and consequently reduces the dead space of the check valve.

Figure 4:
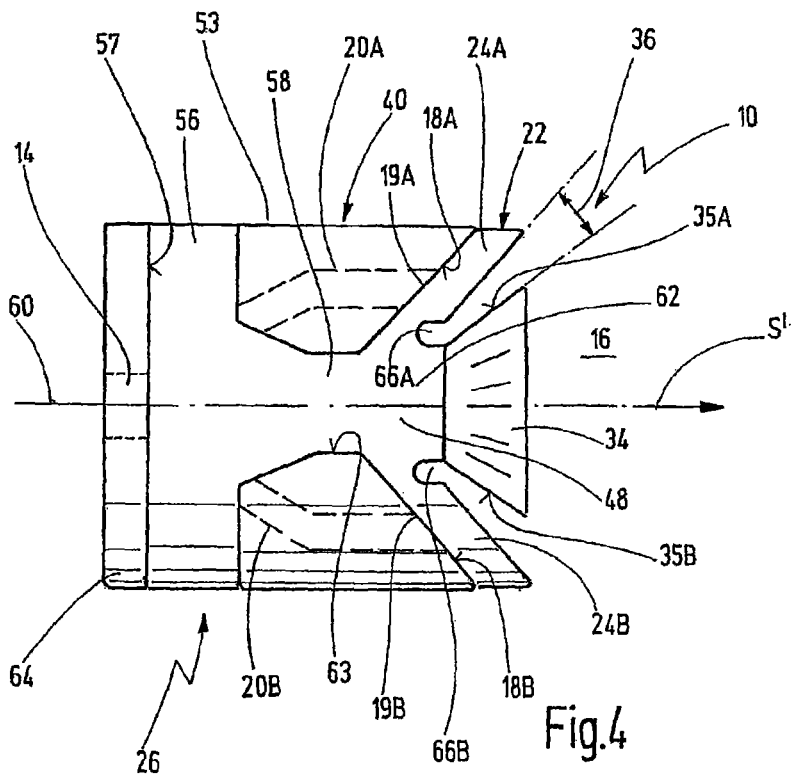
FIG. 4 shows a side view of a further embodiment of a check valve according to the invention.

FIG. 4 shows a further embodiment of a check valve according to the invention which generally corresponds in terms of set-up and functioning to the check valve of FIG. 3.

It can be seen that FIG. 4 illustrates only a first subhousing 40 which has a cylindrical portion 53. The shut-off element 22 is secured to the cylindrical portion 53. Furthermore, the check valve of FIG. 4 differs from that of FIG. 3 in the type of design of the fastening portion 26. Whereas, in the embodiment of FIG. 3, the fastening portion is formed by a transverse web of bead shape, in the embodiment of FIG. 4 a fastening portion 26 which has a ring portion 56 is provided. The ring portion 56 is received in an annular fastening recess 57 encircling the cylindrical portion 53, so that the ring portion 56 does not project in the radial direction with respect to the outer contour of the cylindrical portion 53. The ring portion 56 is connected via longitudinal web portions 58 to the shut-off tabs 24A, 24B connected in one piece. More precisely, the fastening portion 26 has two longitudinal web portions 58 which are arranged on radially opposite sides of the cylindrical portion 53 and only one of which is illustrated in FIG. 4. None of the longitudinal web portions 58 is shown in FIG. 5 because the latter is a sectional illustration.

The longitudinal web portions 58 are connected, at their end facing away from the ring portion 56, to a respective radial end of a transverse web 48 which connects the shut-off tabs 24A, 24B to each other. One end of the transverse web 48 is designated by 62 in FIG. 4. The arrangement of the check valve 10 is symmetrical with respect to an axis of symmetry 60 running through the longitudinal axis of the cylindrical portion 53.

Furthermore, longitudinal recesses, into which the longitudinal web portions 58 are introduced, are shown at 63 on the outer circumference of the cylindrical portion 53 in FIG. 4. The shut-off element 22, overall, therefore does not project with respect to the outer contour of the cylindrical portion 53. As a result, the check valve illustrated in FIGS. 4 and 5 is also suitable, in particular, for use as a linearly movable element, in particular as part of a piston of a fluid pump. When used in a piston of a fluid pump, the second valve housing is preferably formed by a cylinder, within which the piston is guided.

In this embodiment, the abutment element 34 is formed in one piece with the shut-off element 22 and extends, widening conically, between the two shut-off tabs 24A, 24B. The maximum opening angle 36 of the shut-off tabs 24A, 24B at which these bear against the respective abutment faces 35A, 35B amounts to about 10° in the present case.

The abutment element 34 extends in the flow direction S approximately as far as the ends of the shut-off tabs 24A, 24B, so that the space defined between them is filled in an amount of at least 50%, in the presence case in an amount of about 80%. A dead volume which follows the shut-off element in the flow direction is thereby reduced.

Furthermore, the abutment element 34 is designed such that the shut-off tabs 24A, 24B cannot touch each other.

A recess 66A, 66B oriented substantially transversely with respect to the longitudinal axis 60 is formed in the region of a transition between the abutment element 34 and each of the shut-off tabs 24A, 24B. The recesses 66A, 66B serve for increasing the movability or bending flexibility of the shut-off tabs 24A, 24B. The recesses 66A, 66B are preferably arranged so as not to overlap in axial projection, but, instead, adjacently to the longitudinal ducts 20A, 20B which issue in each case in the form of respective valve orifices 19A, 19B in the valve seats 18A, 18B.

The shut-off element 22 and the first subhousing 40 are in each case illustrated separately in FIGS. 6 and 7 in order to make the functions described above clear. It can be seen in FIG. 7, furthermore, that the first subhousing 40 may have, at its front end in the flow direction, a flange portion 64 which projects radially with respect to the cylindrical portion 53 and by means of which the first subhousing 40 can be connected to the second subhousing 42 and be sealed off with respect to the latter. Furthermore, it can be seen in FIG. 7 that each shut-off tab may be assigned not only one, but two longitudinal ducts 20A1, 20A2 which issue in each case in a valve orifice 19A1 and 19A2.

The above-described embodiments of check valves can all be used as stationary immovable check valves in any desired application. Both liquid and gaseous substances may be considered as fluid.

Figure 8:
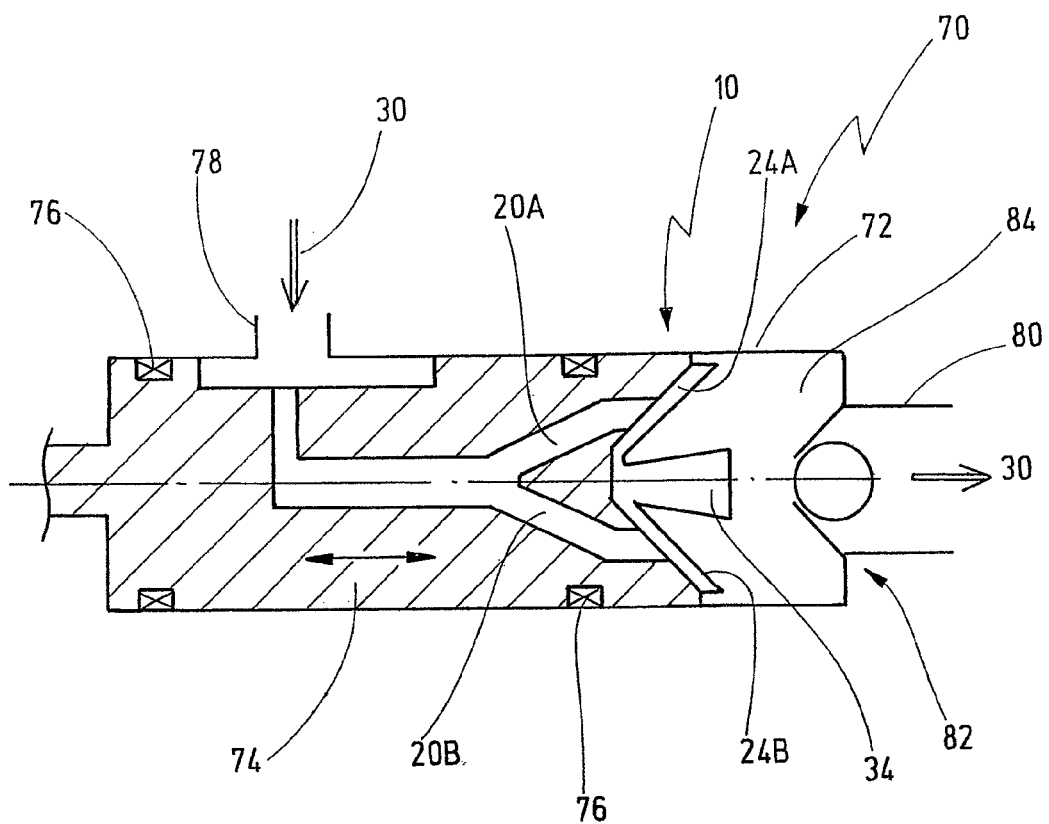
FIG. 8 shows a diagrammatic illustration of a fluid pump according to the invention.

FIG. 8 shows a piston pump 70 in diagrammatic form. The fluid pump 70 has a pump housing 72 in the form of a cylinder in which a piston 74 is guided. The piston 74 is sealed off with respect to the cylinder housing 72 by means of seals 76 and/or a concertina (bellows). Furthermore, a suction connection 78 is provided on an outer circumference of the pump housing 72. A pressure connection 80 is formed at an axial end of the pump housing 72. In the piston, longitudinal ducts are formed, which connect the suction connection 78, via which a fluid 30 is sucked in, to a check valve 10 which is arranged at the front end of the piston 74. The check valve 10 corresponds in general, in terms of set-up and functioning, to the check valve of FIG. 4 to 5 or to another check valve according to the above-described embodiments and has two shut-off tabs 24A, 24B, between which an abutment element 34 is arranged.

Furthermore, the fluid pump 70 contains a second check valve 82 which is indicated diagrammatically as a ball check valve, but may likewise be designed as a check valve according to one of the above embodiments. A valve space 84 is formed between the check valves 10, 82.

The function of the fluid pump 70 involves a first working stroke, in which the piston is moved back (to the left in FIG. 8), a fluid being sucked into the valve space 84 via the suction connection 78. In this case, the check valve 10 is open and the second check valve 82 is closed. In a second working stroke, the piston 74 is moved in the opposite direction. In this case, the check valve 10 is closed and the second check valve 82 is open, so that the fluid located in the valve space 84 is pressed out via the pressure connection 80, until the piston 74 reaches top dead center. The valve space 84 is then a dead space, the volume of which should be as minimal as possible. The abutment element 34 is therefore designed as a volume element which occupies at least 50% of the space between the shut-off tabs 24A, 24B. This is not illustrated especially in FIG. 8 for the sake of clarity.

The second working stroke is followed again by a third working stroke which corresponds to the first working stroke.

Moreover, the amount of deflection of the shut-off tabs 24A, 24B can be reduced by means of the abutment element. A very high stroke frequency or actuating frequency of the piston 74 can thereby be achieved. A high delivery capacity is therefore obtained. There is also low power loss because of the small dead volume.

Since the fluid pump 70 also has no or only very small dead spaces, the fluid pump is suitable, in particular, for the conveyance of fluids which contain constituents capable of being crystallized out, such as, for example, a urea solution. Fluid pumps of this type can consequently be used in DNOX systems.

What is claimed is:

1. A check valve comprising:
   (a) a valve housing, on which is formed a valve seat which is designed as an oblique face with respect to a flow direction,
   (b) a shut-off element having at least two sheet-like shut-off tabs which are composed of an elastically deformable material and which, in a shut-off position, bears against the valve seat and, in an opening position, are lifted off from the valve seat, in order to allow the passage of fluid, and
   (c) an abutment element arranged on that side of the at least two shut-off tabs, which faces away from the valve seat, and, against which the at least two shut-off tabs can abut, in order to limit the amount by which the at least two shut-off tabs are lifted off from the valve seat,
   wherein the at least two shut-off tabs are oriented in a V-shaped manner in longitudinal section, and
   wherein the abutment element is designed as a volume element which fills a space defined between the at least two shut-off tabs in an amount of at least 50% which has a V-shape that widens over its full length in the flow direction.

2. The check valve as claimed in claim 1, wherein abutment faces of the abutment element are oriented obliquely in such a way that the at least two shut-off tabs are also oriented obliquely in the opening position.

3. The check valve as claimed in claim 1, wherein the abutment element extends approximately as far as the at least two shut-off tabs in the flow direction.

4. The check valve as claimed in claim 1, wherein the abutment element is formed in one piece with the shut-off element.

5. The check valve as claimed in claim 4, wherein recesses, which serves for increasing the movability of the at least two shut-off tabs, are formed in regions of transition between the abutment element and the at least two shut-off tabs.

6. The check valve as claimed in claim 1, wherein the abutment element is arranged such that the at least two shut-off tabs cannot touch each other.

7. A fluid pump with a pump housing and with a piston which is mounted displaceably therein and forms with the pump housing a pressure space, a suction connection of the pump being connected to the pressure space via a first check valve, and the pressure space being connected to a pressure connection of the pump via a second check valve, wherein at least one of the first and the second check valves comprises a valve housing, on which is formed a valve seat which is designed as an oblique face with respect to a flow direction, and with a shut-off element having at least two sheet-like shut-off tabs which are composed of an elastically deformable material and which, in a shut-off position, bears against the valve seat and, in an opening position, are lifted off from the valve seat, in order to allow the passage of fluid, there being arranged on that side of the at least two shut-off tabs which faces away from the valve seat an abutment element, against which the at least two shut-off tabs can abut, in order to limit the amount by which the at least two shut-off tabs is lifted off from the valve seat, wherein the abutment element is designed as a volume element which fills a space defined between the at least two shut-off tabs in an amount of at least 50% and which has a V-shape that widens over its full length in the flow direction.

\* \* \* \* \*